United States Patent
Kim (10) Patent No.: US 9,946,411 B2
(45) Date of Patent: Apr. 17, 2018

(54) TOUCH PANEL HAVING DOUBLE ROUTING SCHEME

(71) Applicant: LG INNOTEK CO., LTD., Seoul (KR)

(72) Inventor: Jin Bok Kim, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 35 days.

(21) Appl. No.: 14/296,937

(22) Filed: Jun. 5, 2014

(65) Prior Publication Data
US 2015/0220185 A1    Aug. 6, 2015

(30) Foreign Application Priority Data
Feb. 5, 2014  (KR) .................. 10-2014-0013328

(51) Int. Cl.
*G06F 3/044* (2006.01)
*G06F 3/047* (2006.01)

(52) U.S. Cl.
CPC .... *G06F 3/044* (2013.01); *G06F 2203/04103* (2013.01)

(58) Field of Classification Search
CPC .................. G06F 3/044; G06F 3/0416; G06F 2203/04111; G06F 1/16; G06F 3/047; G06F 2203/04103
See application file for complete search history.

(56) References Cited

U.S. PATENT DOCUMENTS

| | | | | |
|---|---|---|---|---|
| 2010/0134439 A1* | 6/2010 | Ito | ........................... | G06F 3/044 345/174 |
| 2011/0227846 A1* | 9/2011 | Imazeki | .................. | G06F 3/044 345/173 |
| 2011/0242057 A1* | 10/2011 | Lee | ........................ | G06F 3/041 345/176 |
| 2011/0304566 A1* | 12/2011 | Han | ........................ | G06F 3/044 345/173 |
| 2013/0092520 A1* | 4/2013 | Lee | ........................ | G06F 3/044 200/600 |
| 2013/0215082 A1* | 8/2013 | Mi | .......................... | G06F 3/044 345/174 |
| 2013/0314335 A1* | 11/2013 | Kang | ..................... | G06F 3/044 345/173 |
| 2014/0085550 A1* | 3/2014 | Chang | .................... | G06F 1/169 349/12 |
| 2014/0204286 A1* | 7/2014 | Park | ...................... | G06F 1/1626 349/12 |
| 2014/0247226 A1* | 9/2014 | Chiu | ...................... | G06F 3/041 345/173 |
| 2015/0015812 A1* | 1/2015 | Takakusagi | ............ | G06F 3/044 349/12 |
| 2015/0138453 A1* | 5/2015 | Jang | ....................... | G06F 3/044 349/12 |

* cited by examiner

*Primary Examiner* — Kumar Patel
*Assistant Examiner* — Amy C Onyekaba
(74) *Attorney, Agent, or Firm* — Saliwanchik, Lloyd & Eisenschenk

(57) ABSTRACT

Disclosed is a touch panel including a cover substrate including an active area and an unactive area, first and second sensing electrodes extending in mutually different directions on the active area, a first printed circuit board connected with one end of the first sensing electrode, and a second printed circuit board connected with an opposite end of the first sensing electrode.

17 Claims, 6 Drawing Sheets

TOUCH PANEL HAVING DOUBLE ROUTING SCHEME

CROSS-REFERENCE TO RELATED APPLICATION

This application claims the benefit under 35 U.S.C. § 119 of Korean Patent Application No. 10-2014-0013328, Feb. 5, 2014, which is hereby incorporated by reference in its entirety.

BACKGROUND

The embodiment relates to a touch panel.

Recently, a touch panel, which performs an input function through the touch of an image displayed on a display by an input device such as a stylus pen or a hand, has been applied to various electronic appliances.

The touch panel may be mainly classified into a resistive touch panel and a capacitive touch panel. In the resistive touch panel, glass is shorted with an electrode due to the pressure of the input device so that a touch point is detected. In the capacitive touch panel, the variation in capacitance between electrodes is detected when a finger of the user is touched on the capacitive touch panel, so that the touch point is detected.

In the resistive type touch panel, the repeated use thereof may degrade the performance thereof, and cause scratches. Accordingly, the interest in the capacitive type touch panel representing superior endurance and having a long lifespan is increased.

The touch panel has a sensing electrode formed on a cover substrate and/or a substrate, and may be connected with a printed circuit board through a wire electrode connected with the sensing electrode.

The wire electrode may be formed on an area (i.e., unactive area), in which a touch is not detected, of a cover substrate area. As the wire electrode is widened, the unactive area, that is, a Bezel area of the touch panel may be widened.

Schemes of connecting the sensing electrode with the wire electrode are classified into a single routing scheme of connecting one of both ends of the sensing electrode with the wire electrode and a double routing scheme of connecting both ends of the sensing electrode with the wire electrode.

In this case, when the wire electrode is connected with the sensing electrode through the double routing scheme, the line resistance of the wire electrode may be reduced, so that the efficiency of the touch panel may be improved. However, when comparing with the single routing scheme, as the wire electrode must be formed in size two times greater than that in the single routing scheme, the Bezel area of the touch panel may be widened.

Accordingly, there is required a touch panel having a novel structure in which the wire electrode can be connected with the sensing electrode through the double routing scheme, and the Bezel area can be reduced.

BRIEF SUMMARY

The embodiment provides a touch panel having a bezel area realized in a narrow area and improved efficiency.

According to the embodiment, there is provided touch panel including a cover substrate including an active area and an unactive area, first and second sensing electrodes extending in mutually different directions on the active area, a first printed circuit board connected with one end of the first sensing electrode, and a second printed circuit board connected with an opposite end of the first sensing electrode.

According to the touch panel of the embodiments, the efficiency of the touch panel can be improved by reducing electrode resistance as the electrodes are connected with each other through the double routing scheme. As two printed circuit boards are used, the Bezel area of the touch panel can be reduced, so that the touch panel can be realized in small size.

DETAILED DESCRIPTION

In the following description of the embodiments, it will be understood that, when a layer (or film), an area, a pattern, or a structure is referred to as being "on" or "under" another substrate, another layer (or film), another area, another pad, or another pattern, it can be "directly" or "indirectly" on the other substrate, layer (or film), area, pad, or pattern, or one or more intervening layers may also be present. Such a position of the layer has been described with reference to the drawings.

The thickness and size of each layer (or film), area, pattern or structure shown in the drawings may be exaggerated, omitted or schematically drawn for the purpose of convenience or clarity. In addition, the size of elements does not utterly reflect an actual size.

Hereinafter, the embodiment will be described with reference to accompanying drawings.

Referring to FIGS. 1 to 4, the touch panel according to the embodiment may include a cover substrate 100.

The cover substrate 100 may include an active area AA and an unactive area UA. In detail, the active area AA refers to an area through which a touch instruction may be input by a user. To the contrary to the active area AA, the unactive area UA refers to an area to which the touch instruction is not input because the unactive area UA is not activated even if the touch of the user is input thereto The unactive area UA may be an edge area of the cover substrate 100. The unactive area UA may include a plurality of areas. In detail, the unactive area UA may include first to fourth unactive areas UA. In more detail, the unactive area UA may include first and second unactive areas UA1 and UA2 facing each other, and third and fourth unactive areas UA3 and UA4 facing each other. The first to fourth unactive areas UA1 to UA4 are formed integrally with each other while extending along the edges of the cover substrate 100.

The cover substrate 100 may include glass or plastic. For example, the cover substrate 100 may include tempered glass, half-tempered glass, sodalime glass, reinforced plastic, or flexible plastic.

The cover substrate 100 may support a printing layer 200, a sensing electrode, a wire electrode 400, and a printed circuit board provided on the cover substrate 100.

The printing layer 200 may be provided on the unactive area UA. The printing layer 200 may be provided to surround the edge area of the cover substrate 100. The printing layer 200 on the unactive area UA may prevent an electrode, which is provided on the unactive area UA, from being viewed outside.

The printing layer 200 may be formed in black or white. In detail, the printing layer 200 may be formed by using black ink or white ink. If necessary, the printing layer 200 may include a plurality of layers, and may have the thickness of about 20 µm to about 35 µm.

If the printing layer 200 has the thickness of about 20 µm or less, the printing layer 200 has a thin thickness, so that the electrode provided on the unactive area UA may be viewed outside. If the printing layer 200 has the thickness exceeding about 35 µm, the electrode may be cracked due to the step difference between printing layers, so that a short phenomenon may occur, and the whole thickness of the touch panel may be increased.

The sensing electrode may be provided on the active area AA.

The sensing electrode may include a conductive material. In detail, the sensing electrode may include a transparent conductive material. For example, the sensing electrode may include a transparent conductive material such as indium tin oxide (ITO).

Figure 1:
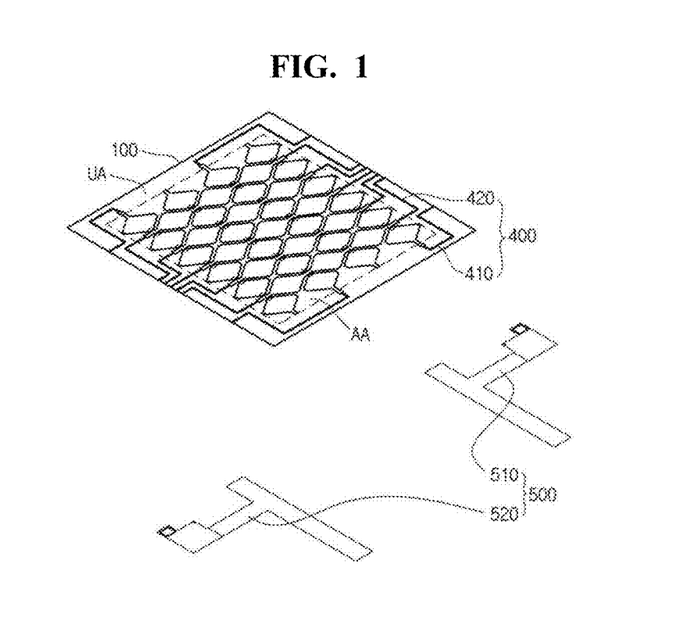
FIG. 1 is a perspective view showing a touch panel according to the embodiment.
Figure 2:
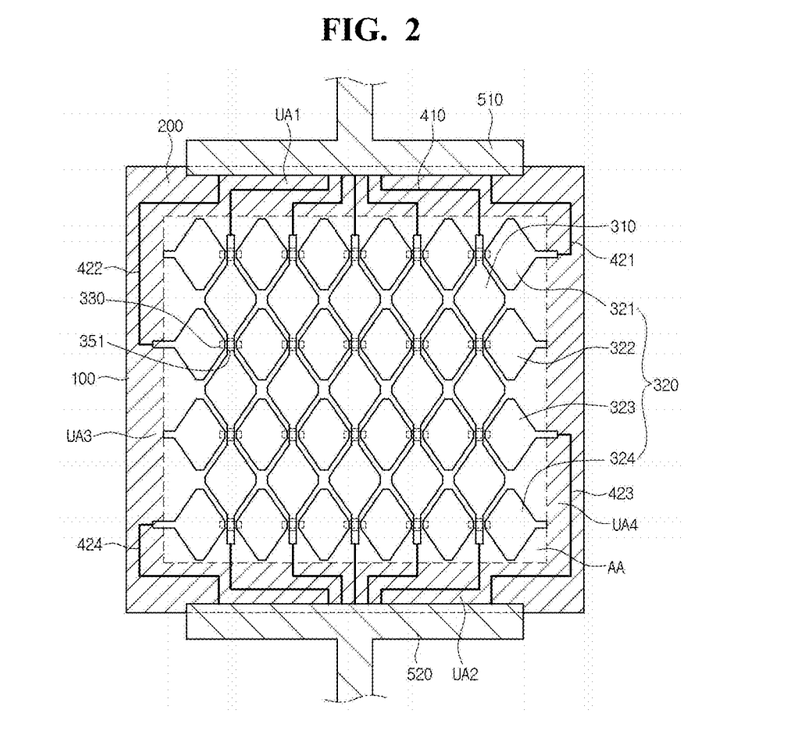
FIG. 2 is a plan view showing the touch panel according to the embodiment.
Figure 3:
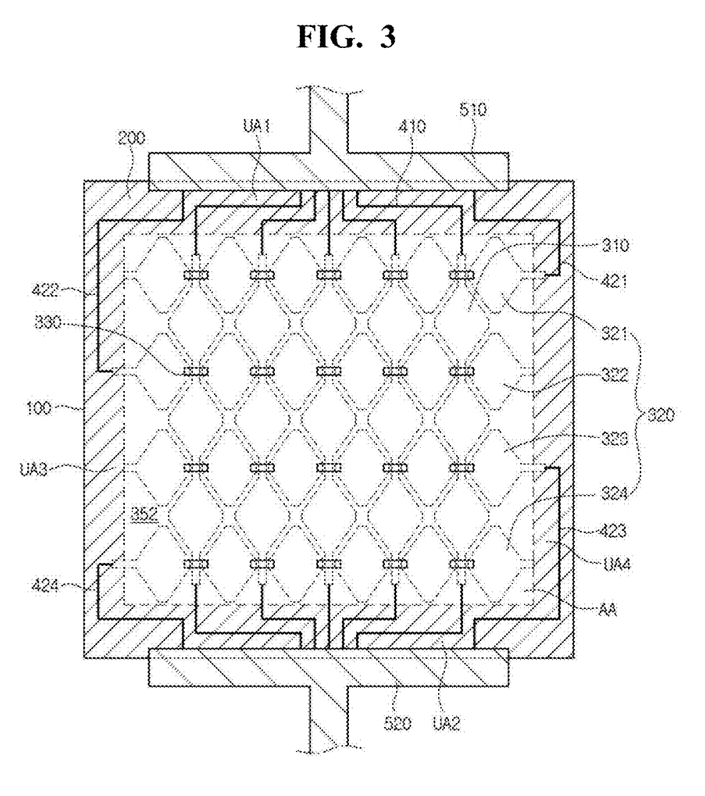
FIG. 3 is another plan view showing the touch panel according to the embodiment.

The sensing electrode may include a first sensing electrode 310, a second sensing electrode 320, and a bridge electrode 330. The first sensing electrode 310, the second sensing electrode 320, and the bridge electrode 330 may include the same material, or mutually different materials. In addition, the first sensing electrode 310, the second sensing electrode 320, and the bridge electrode 330 may be provided on the same surface of the cover substrate 100.

The first sensing electrode 310 may include a transmit electrode to transmit a touch signal. In addition, the second sensing electrode 320 may include a receive electrode to receive the touch signal. However, the embodiment is not limited thereto. In other words, the first sensing electrode 310 may include the receive electrode, and the second sensing electrode 320 may include the transmit electrode. That is to say, one of the first and second sensing electrodes 310 and 320 may include the transmit electrode, and the other sensing electrode may include the receive electrode. In detail, the transmit and receive electrodes are collectively referred to as a sensing electrode.

For example, the bridge electrode 330 may have the shape of a bar. In detail, bridge electrodes 330 may have the shape of bars spaced apart from each other by a predetermined interval on the active area AA. The bridge electrode 330 may connect first sensing electrodes 310, which are described later, with each other.

An insulating layer or an insulating pattern may be provided on the bridge electrode 330. In detail, the insulating layer or the insulating pattern may be partially provided on the bridge electrode 330, and a portion of the bridge electrode 330 may be covered by the insulating layer or the insulting pattern. For example, if the bridge electrode 330 is provided in the shape of a bar, the insulating layer or the insulating pattern may be provided on an area other than one end and an opposite end of the bridge electrode 330, that is, both ends of the bridge electrode 330.

The first and second sensing electrodes 310 may serve as sensors provided on the active area AA to sense touches. In detail, the first sensing electrode 310 may extend in one direction on the active area AA, and the second sensing electrode 320 may extend in a direction different form the one direction.

One of the first and second sensing electrodes 310 and 320 may be provided on the insulating layer or the insulating pattern, and the other of the first and second sensing electrodes 310 and 320 may be connected with both ends of the bridge electrode 330.

For example, as shown in FIGS. 2 and 3, the first sensing electrode 310 may be provided on an insulating pattern 351. The first sensing electrodes 310 may be electrically connected with each other. In addition, the second sensing electrodes 320 may be electrically connected with both ends of the bridge electrode 330, so that the second sensing electrodes 320 may be electrically connected with each other. Accordingly, the first and second sensing electrodes 310 and 320 are not disconnected from each other, which results from short, due to the bridge electrode and the insulating pattern so that the first and second sensing electrodes 310 and 320 are electrically connected with each other.

Although the above description has been made in that the bridge electrode, the insulating pattern, and the sensing electrodes are sequentially stacked on each other, the embodiment is not limited thereto. In other words, the sensing electrode, the insulating layer, and the bridge electrode may be sequentially stacked on each other.

That is to say, as shown in FIG. 3, the first and second sensing electrodes 310 and 320 may be formed on the active area AA. In this case, the first sensing electrodes 310 may be electrically connected with each other, and the second sensing electrodes 320 may be disconnected from each other.

Next, an insulating layer 352 is provided to surround the first and second sensing electrodes 310 and 320, and a through hole is formed in the insulating layer 352 corresponding to the position of the second sensing electrode 320. Thereafter, the bridge electrode 330 is provided on the insulating layer 352 to connect the second sensing electrodes 320 with each other.

Accordingly, the first and second sensing electrodes 310 and 320 are not disconnected from each other, which results from short, due to the bridge electrode and the insulating layer so that the first and second sensing electrodes 310 and 320 are electrically connected with each other.

The first and second sensing electrodes 310 and 320 may be connected with the printed circuit board. In detail, the first and second sensing electrodes 310 and 320 may be connected with the printed circuit board through the wire electrode 400.

The wire electrode 400 may be provided on the unactive area UA. In detail, the wire electrode 400 may be provided on the printing layer 200.

The wire electrode 400 may include first and second wire electrodes 410 and 420. In detail, the wire electrode 400 may include the first wire electrode 410 connected with the first sensing electrode 310 and the second wire electrode 420 connected with the second sensing electrode 320.

The first and second wire electrodes 410 and 420 may be connected with the printed circuit board. In other words, one ends of the first and second wire electrodes 410 and 420 may be connected with the sensing electrodes, and the other ends of the first and second wire electrodes 410 and 420 may be connected with the printed circuit board.

In addition, the first wire electrodes 410 may be connected with the central portion of the printed circuit board, and the second wire electrodes 420 may be connected with both ends of the printed circuit board.

In detail, the first wire electrodes 410 may be connected with first and second printed circuit boards 510 and 520 on the first unactive area UA1 and the second unactive area UA2, respectively.

In other words, the first wire electrode 410 connected with one end of the first sensing electrode 310 may be provided on the first unactive area UA1 and connected with the first printed circuit board 510. The second wire electrode 420 connected with the opposite end of the first sensing electrode 310 may be provided on the second unactive area UA2 and connected with the second printed circuit board 520.

In addition, the second wire electrode 420 may be connected with one end or an opposite end of the second sensing electrode 320 and connected with the first printing circuit board 510 or the second printing circuit board 520.

The second sensing electrode 320 may include one group of second sensing electrodes and another group of second electrodes. In detail, the second sensing electrode 320 may include one group of second sensing electrodes connected to the first printed circuit board 510 and another group of second sensing electrodes connected with the second printed circuit board 520.

A portion of the second sensing electrodes belonging to one group may have one end connected with the first printed circuit board 510, and a remaining portion of the second sensing electrodes belonging to the one group may have an opposite end connected with the first printed circuit board 510.

In other words, referring to FIGS. 2 and 3, one end of the second sensing electrode belonging to one group is connected with the second wire electrode 420 in the third unactive area UA3, and the second wire electrode 420 extends to the first unactive area UA1 so that the second wire electrode 420 may be connected with the first printed circuit board 510.

In addition, the opposite end of the second sensing electrode belonging to one group is connected with the second wire electrode 420 in the fourth unactive area UA4, and the second wire electrode 420 extends to the first unactive area UA1 so that the second wire electrode 420 may be connected with the first printed circuit board 510.

In this case, among the second sensing electrodes belonging to one group, the second sensing electrode having the one end connected with the first printed circuit board 510 may be alternately aligned with the second sensing electrode having the opposite end connected with the first printed circuit board 510.

In addition, a portion of the second sensing electrodes belonging to the another group may have one end connected with the second printed circuit board 520, and a remaining portion of the second sensing electrodes belonging to the another group may have an opposite end connected with the second printed circuit board 520.

In other words, one end of the second sensing electrode belonging to the another group is connected with the second wire electrode 420 in the third unactive area UA3, and the second wire electrode 420 extends to the second unactive area UA2 so that the second wire electrode 420 may be connected with the second printed circuit board 520.

In addition, the opposite end of the second sensing electrode belonging to the another group is connected with the second wire electrode 420 in the fourth unactive area UA4, and the second wire electrode 420 extends to the second unactive area UA2 in the fourth unactive area UA4, so that the second wire electrode 420 may be connected with the second printed circuit board 520.

In this case, among the second sensing electrodes belonging to the another group, the second sensing electrode having the one end connected with the second printed circuit board 520 may be alternately aligned with the second sensing electrode having the opposite end connected with the second printed circuit board 520.

The number of wire electrodes connected with the first printed circuit board 510 may be equal to the number of wire electrodes connected with the second printed circuit board 520.

The sum of the number of the first wire electrodes 410, which are connected with the first printed circuit board 510 and connected with one end of the first sensing electrode 310, and the number of the second wire electrodes 420, which are connected with the first printed circuit board 510 and connected with the sensing electrodes belonging to one group, is equal to the sum of the number of the first wire electrodes 410 connected with the second printed circuit board 520 and connected with an opposite end of the first sensing electrode 310 and the number of the second wire electrodes 420 connected with the second printed circuit board 520, and connected with the second sensing electrodes belonging to the another group.

In other words, the number of the wire electrodes provided in the first unactive area UA1 may be equal to the number of the wire electrodes provided in the second unactive area UA2.

In addition, the number of the sensing electrodes may be equal to or different from the number of the wire electrodes.

In detail, the number of the first sensing electrodes 310 may be a half of the number of the first wire electrodes 410. In other words, the number of the first sensing electrodes 310 may be a half of the number of the first wire electrodes 410 connected with one end and an opposite end of the first sensing electrodes 310.

In addition, the number of the second sensing electrodes 320 may be equal to the number of the second wire electrodes 420. In other words, the number of the second sensing electrodes 320 may be a half of the number of the first wire electrodes 410 connected with one end or an opposite end of the second sensing electrode 320. The first wire electrode 410 and the second wire electrode 420 may include a conductive material. In detail, the first wire electrode 510 and the second wire electrode 520 may include a metallic material such as silver (Ag) or copper (Cu).

The printed circuit board 510 may have a driving chip mounted therein. The touch signal sensed by the sensing electrode is transmitted to the printed circuit board through the wire electrode 400, so that the touch signal may be transmitted to the driving chip.

The printed circuit board may be flexible. For example, printed circuit boards may include flexible printed circuit boards (FPCBs).

The printed circuit boards may include the first and second printed circuit boards 510 and 520. The first and second printed circuit boards 510 and 520 may be provided on the unactive area UA. In detail, the first printed circuit board 510 may face the second printed circuit board 520. In other words, the first printed circuit board 510 may be provided in opposition to the second printed circuit board 520. In more detail, the first and second printed circuit boards 510 and 520 may be provided in the first and second unactive areas UA1 and UA2, respectively. In addition, the first and second printed circuit boards 510 and 520 may be provided on the third and fourth unactive areas UA3 and UA4, respectively.

Figure 4:
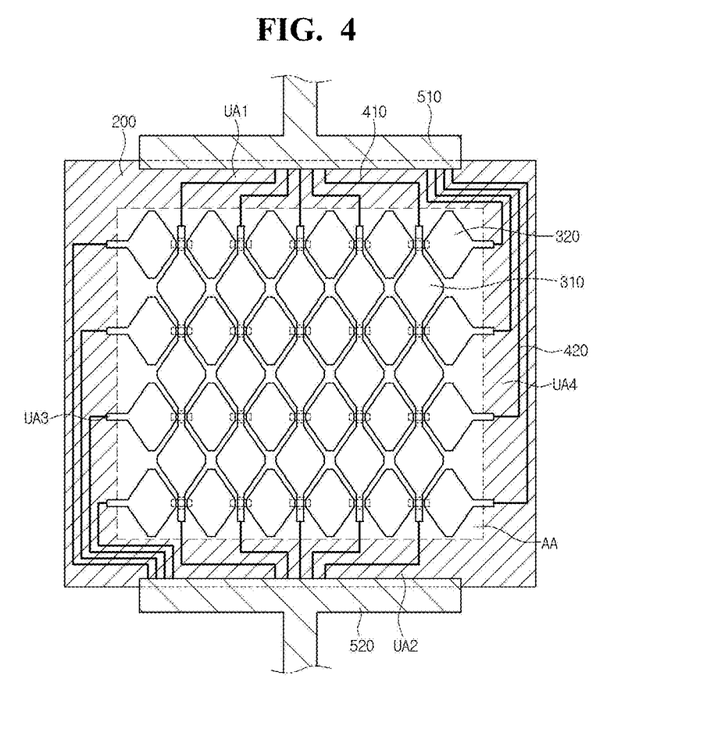
FIG. 4 is a plan view showing a touch panel according to another embodiment.

Although FIGS. 2 to 4 show that the first and second printed circuit boards 510 and 520 are provided in the first and second unactive areas UA1 and UA2, respectively, the embodiment is not limited thereto. In other words, the first and second printed circuit boards 510 and 520 may be provided in various areas in such a manner that the first and second printed circuit boards 510 and 520 face each other.

At least one of the first and second sensing electrodes 310 and 320 may have one end connected with the first printed circuit board 510, and an opposite end connected with the second printed circuit board 520.

Referring to FIGS. 2 and 3, the second sensing electrode 320 may include a first-sub second sensing electrode 321 and a second-sub second sensing electrode 322. The first-sub second sensing electrode 321 and the second-sub second sensing electrode 322 may be connected with the printed circuit board through the second wire electrode 420. In other words, the first-sub second sensing electrode 321 and the second-sub second sensing electrode 322 may be the second sensing electrodes belonging to one group.

The first-sub second sensing electrode 321 and the second-sub second sensing electrode 322 may be connected with the first printed circuit board 510. In detail, one end of the first-sub second sensing electrode 321 may be connected with the first printed circuit board 510, and an opposite end of the second-sub second sensing electrode 322 may be connected with the first printed circuit board 510.

Accordingly, a first-sub second wire electrode 421 and a second-sub second wire electrode 422 connected with the second sensing electrode 320 may extend in directions different from each other.

In other words, the first-sub second wire electrode 421 connected with the first-sub second sensing electrode 321 extends in the direction of the first unactive area UA1 along the unactive area UA, that is, the fourth unactive area UA4, so that the first-sub second wire electrode 421 may be connected with the first printed circuit board 510.

In other words, the second-sub second wire electrode 422 connected with the second-sub second sensing electrode 322 extends in the direction of the first unactive area UA1 along the unactive area UA, that is, the third unactive area UA3, so that the second-sub second wire electrode 422 may be connected with the first printed circuit board 510.

In addition, the second sensing electrode 320 may further include a third-sub second sensing electrode 323 and a fourth-sub second sensing electrode 324. The third-sub second sensing electrode 323 and the fourth-sub second sensing electrode 324 may be connected with the printed circuit board through the second wire electrode 420. In other words, the third sub-second sensing electrode 323 and the fourth-sub second sensing electrode 324 may be the second sensing electrodes belonging to the another group.

In detail, the third-sub second sensing electrode 323 and the fourth-sub second sensing electrode 324 may be connected with the second printed circuit board 520. In detail, one end of the third-sub second sensing electrode 323 may be connected with the second printed circuit board 520, and an opposite end of the fourth-sub second sensing electrode 324 may be connected with the second printed circuit board 520.

Accordingly, the third-sub second wire electrode 423 and the fourth-sub second wire electrode 424 connected with the second sensing electrode 320 may extend in directions different from each other.

In other words, the third-sub second wire electrode 423 connected with the third-sub second sensing electrode 323 extends in the direction of the second unactive area UA2 along the unactive area UA, that is, the fourth unactive area UA4, so that the third-sub second wire electrode 423 may be connected with the second printed circuit board 520.

In addition, the fourth-sub second wire electrode 424 connected with the fourth-sub second sensing electrode 324 extends in the direction of the second unactive area UA2 along the unactive area UA, that is, the third unactive area UA3, so that the fourth-sub second wire electrode 424 may be connected with the second printed circuit board 520.

Although the second sensing electrodes belonging to the one group and the other group have been described as the first to fourth-sub second sensing electrodes, the embodiment is not limited thereto. The second sensing electrodes belonging to the one group and the other group may include a plurality of sub-sensing electrodes such as fifth and sixth-sub sensing electrodes.

The first sensing electrode 310 may be connected with the first and second printed circuit boards 510 and 520. In detail, one end of the first sensing electrode 310 may be connected with the first printed circuit board 510, and an opposite end of the first sensing electrode 310 may be connected with the second printed circuit board 520.

Accordingly, in the touch panel of the embodiment, the first sensing electrode 310 may be connected with the printed circuit board at one of one end and an opposite end thereof, and the second sensing electrode 320 may be connected with the printed circuit board through the wire electrode at both of one end and an opposite end thereof.

The first printed circuit board 510 and the second printed circuit board 520 may be connected with each other. In detail, a driving substrate may be further provided on the cover substrate. In other words, the first and second printed circuit boards 510 and 520 may be connected with the driving substrate. In the driving substrate, the first printed circuit board 510 may be electrically connected with the second printed circuit board 520.

Hereinafter, a touch panel according to another embodiment will be described with reference to FIG. 4. In the following description of the touch panel according to another embodiment, the structure and the components the same as or similar to those of the touch panel according to the prior embodiment described above will not be further described, and the same reference numerals will be assigned to the same structure.

Referring to FIG. 4, the first sensing electrode 310 may be connected with the first and second printed circuit boards 510 and 520. In detail, in the first sensing electrode 310, one end of the first sensing electrode 310 may be connected with the first printed circuit board 510, and an opposite end of the first sensing electrode 310 may be connected with the second printing circuit board 520 through the first wire electrode 410.

In other words, on the first and second unactive areas UA1 and UA2, the first wire electrode 410 may be connected with the first sensing electrode 310, and may be connected with the first and second printed circuit boards 510 and 520.

In addition, the second sensing electrode 320 may be connected with the first and second printed circuit boards 510 and 520. In detail, one end of the second sensing electrode 320 may be connected with the first printed circuit board 510, and an opposite end of the second sensing electrode 320 may be connected with the second printed circuit board 520.

In other words, the second wire electrode 420 is connected with one end of the second sensing electrode 320 in the third unactive area UA3 to extend toward the second unactive area UA1 in the third unactive area UA3, so that the second wire electrode 420 may be connected with the second printed circuit board 520.

In other words, the second wire electrode 420 is connected with the opposite end of the second sensing electrode 320 in the fourth unactive area UA4 to extend toward the first unactive area UA1 in the fourth unactive area UA4, so that the second wire electrode 420 may be connected with the first printed circuit board 510. Accordingly, in the touch panel according to another embodiment, one ends and opposite ends of the first and second sensing electrodes 310 and 320, that is, both ends of the first and second sensing electrodes 310 and 320 may be connected with the printed circuit board through the wire electrodes.

In the touch panel according to the embodiments, when the first sensing electrode and/or the second sensing electrode are connected with the printed circuit board through the wire electrodes, the first sensing electrode and/or the second sensing electrode may be connected with two printed circuit board through a double routing scheme.

In detail, in the touch panel according to the embodiment, the first sensing electrode is connected through a single routing scheme, and sub-sensing electrodes are separately connected with the first and second printed circuit boards.

In more detail, when first to $2n^{th}$ wire electrodes connected with the sensing electrodes are provided, the first to $n^{th}$ wire electrodes are connected with the first printed circuit board, and the $(n+1)^{th}$ to 2n wire electrodes are connected with the second printed circuit board, so that the wire electrodes may be separately connected to the first and second printed circuit boards.

Accordingly, when the double routing scheme based on one printed circuit board is employed, the unactive area UA of the touch panel, that is, Bezel area can be reduced in half.

In addition, the second sensing electrode may be connected with the first and second printed circuit boards through the double routing scheme.

Accordingly, the upper electrode may be connected with the upper printed circuit board, and the lower electrode may be directly connected with the lower printed circuit board, so that the Bezel area can be completely removed.

Therefore, in the touch panel according to the embodiment, as electrodes are connected through the double routing scheme, the electrode resistance is reduced, so that the effectiveness of the touch panel can be improved. The Bezel area of the touch panel can be reduced by using two printed circuit boards, so that the touch panel can be realized in small size.

In addition, in the touch panel according to another embodiment, as the first and second sensing electrodes are connected through the double routing scheme, the electrode resistance is reduced, so that the effectiveness of the touch panel can be improved. The Bezel area of the touch panel, especially, the Bezel area connected with the second sensing electrode, can be reduced by using two printed circuit boards, so that the touch panel can be realized in small size.

Hereinafter, another type touch panel will be described with reference to FIGS. 5 and 6. In the following description of the other type touch panel, the structure and the components the same as or similar to those of the touch panel according to the prior embodiment described above will not be further described, and the same reference numerals will be assigned to the same structure.

Figure 5:
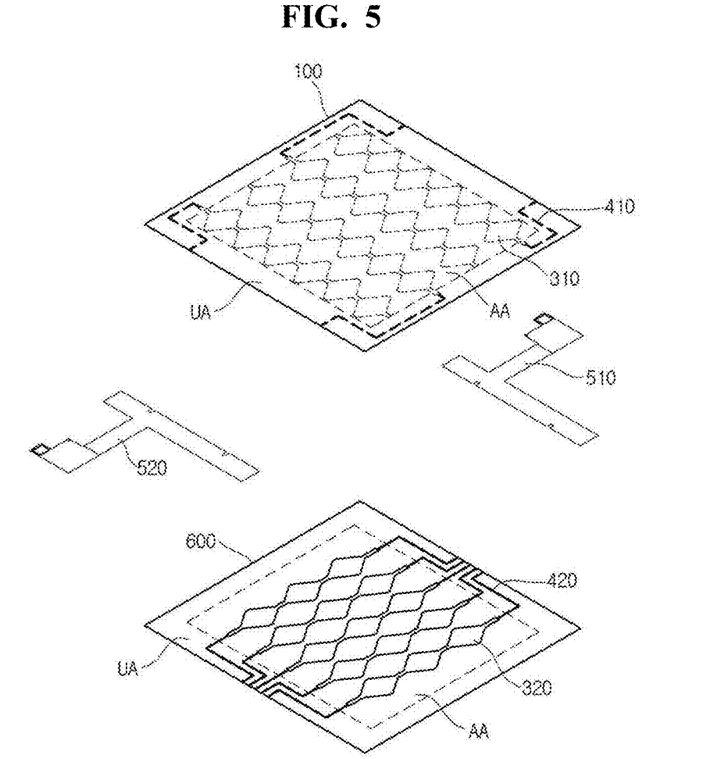
FIGS. 5 and 6 are perspective views showing different types of touch panels.

Referring to FIG. 5, another type touch panel may further include a substrate 600 provided on the cover substrate 100. The substrate 600 may include plastic. For example, the substrate 600 may include polyethylene terephthalate (PET).

The cover substrate 100 may be bonded to the substrate 600 by using a transparent adhesive such as an optical clear adhesive.

The cover substrate 100 and the substrate 600 include active areas and unactive areas. The active areas and the unactive areas may be the same as those described above.

The first sensing electrode 310 may be provided in the active area of the cover substrate 100. In addition, the first wire electrode connected with the first sensing electrode 310 may be provided in the unactive area UA of the cover substrate 100.

The second sensing electrode 320 may be provided in the active area of the substrate 600. In addition, the second wire electrode connected with the second sensing electrode 320 may be provided in the unactive area of the substrate 600.

In addition, the first and second printed circuit boards 510 and 520 may be connected with the first and second wire electrodes, respectively.

In detail, the first and second printed circuit boards 510 and 520 may be interposed between the cover substrate 100 and the substrate 600.

Further, the first printed circuit board 510 may be connected with the first and second wire electrodes 410 and 420 provided on the first unactive area UA1, and the second printed circuit board 520 may be connected with the first and second wire electrodes 410 and 420 provided on the second unactive area UA2.

Figure 6:
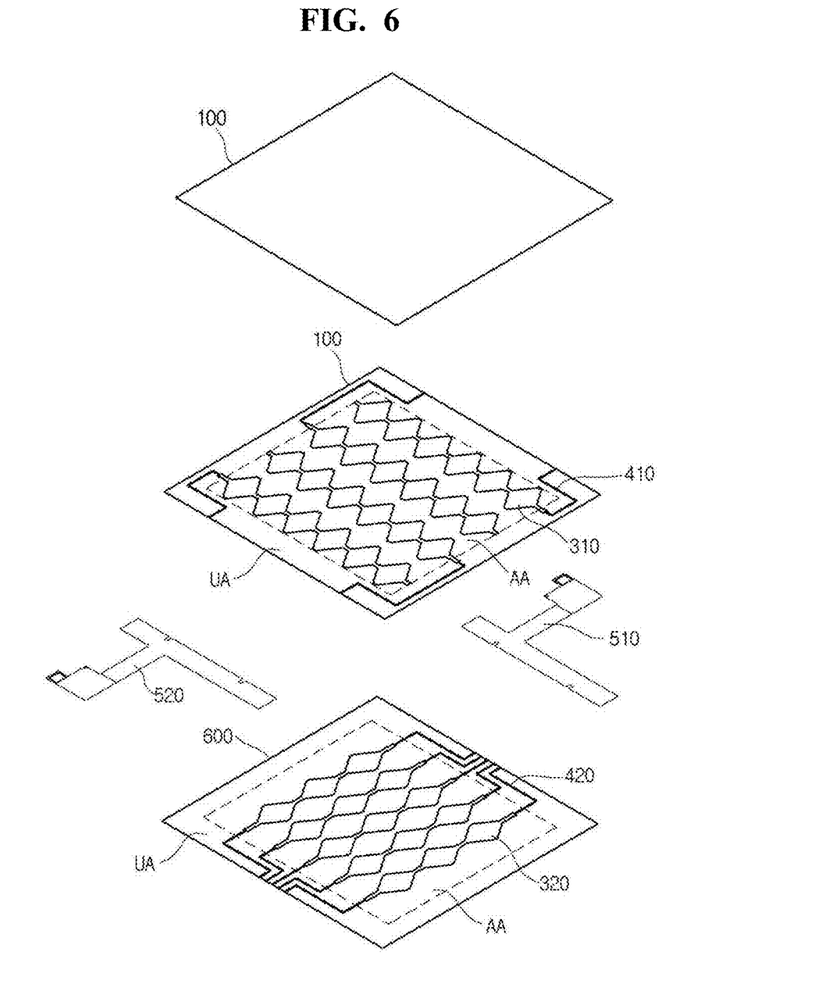

Referring to FIG. 6, another-type touch panel may further include first and second substrates 610 and 620 provided on the cover substrate 100. The first and second substrates 610 and 620 may include plastic. For example, the first and second substrates 610 and 620 may include PET.

The cover substrate 100, the first substrate 610, and the second substrate 620 may be bonded to each other by using a transparent adhesive such as an OCA.

The cover substrate 100, the first substrate 610, and the second substrate 620 may include active areas and unactive areas. The active areas and the unactive areas may be the same as those described above.

The first sensing electrode 310 may be provided in the active area of the first substrate 610. In addition, the first wire electrode connected with the first sensing electrode 310 may be provided in the unactive area of the first substrate 610.

Further, the second sensing electrode 320 may be provided in the active area of the second substrate 620. In addition, the second wire electrode connected with the second sensing electrode 320 may be provided in the unactive area UA of the second substrate 620.

In addition, the first and second wire electrodes may be connected with the first printed circuit board 510 and the second printed circuit board 520.

In detail, the first and second printed circuit boards 510 and 520 may be interposed between the cover substrate 100 and the substrate 600.

Further, the first printed circuit board 510 may be connected with the first and second wire electrodes 410 and 420 provided on the first unactive area UA1, and the second printed circuit board 520 may be connected with the first and second wire electrodes 410 and 420 provided on the second unactive area UA2.

Figure 7:
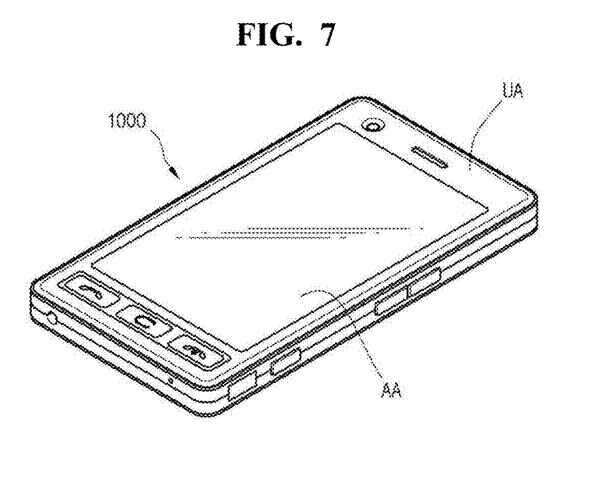
FIG. 7 is a perspective view showing one example of a display to which the touch panel according to the embodiment is applied.

FIG. 7 is a perspective view showing a mobile terminal 1000 including the above-described touch panel.

Referring to FIG. 7, the mobile terminal 1000 may include an active area AA and an unactive area UA. The active area AA detects a touch signal generated due to the touch of a finger, and the unactive area UA may include a command icon pattern part and a logo.

Although FIG. 7 shows the mobile terminal as one example, the above-described touch panel may be usable for vehicles, or various electronic appliances such as home appliances, to which a touch panel is applicable, in addition to the mobile terminal.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A touch panel comprising:
   a cover substrate including an active area and an unactive area;
   first and second sensing electrodes extending in mutually different directions and disposed only on the active area;
   a printing layer disposed only on the unactive area;
   first and second wire electrodes provided on the unactive area and connected with the first and second sensing electrodes, respectively;
   a first printed circuit board connected with one end of the first sensing electrode; and
   a second printed circuit board connected with an opposite end of the first sensing electrode;
   wherein the first and second sensing electrodes are aligned with the cover substrate,
   wherein the first and second sensing electrodes are in direct physical contact with the cover substrate,
   wherein the first sensing electrode, the second sensing electrode, and the printing layer are disposed on the same surface of the cover substrate,
   wherein the first and the second wire electrodes are in direct physical contact with the printing layer,
   wherein the second sensing electrode is in direct physical contact with the printing layer,
   wherein the second sensing electrode is in direct physical contact with the second wire electrode at a top surface of the printing layer,
   wherein the printing layer has a thickness in a range of from 20 μm to 35 μm,
   wherein the printing layer comprises a black ink or a white ink,
   wherein the second sensing electrode comprises:
      one group of second sensing electrodes connected with the first printed circuit board; and
      another group of second sensing electrodes connected with the second printed circuit board,
   wherein the one group of second sensing electrodes comprises a first-sub second sensing electrode and a second-sub second sensing electrode,
   wherein one end of the first-sub second sensing electrode is connected with the first printed circuit board and an opposite end of the second-sub second sensing electrode is connected with the first printed circuit board,
   wherein the first-sub second sensing electrode and the second-sub second sensing electrode are alternately aligned,
   wherein the first-sub second sensing electrode is disposed at a top and a bottom of the second-sub second sensing electrode,
   wherein the second-sub second sensing electrode is disposed at a top and a bottom of the first-sub second sensing electrode,
   wherein the another group of second sensing electrodes comprises a third-sub second sensing electrode and a fourth-sub second sensing electrode,
   wherein one end of the third-sub second sensing electrode is connected with the second printed circuit board and an opposite end of the fourth-sub second sensing electrode is connected with the second printed circuit board,
   wherein the third-sub second sensing electrode and the fourth-sub second sensing electrode are alternately aligned,
   wherein the third-sub second sensing electrode is disposed at a top and a bottom of the fourth-sub second sensing electrode, and
   wherein the fourth-sub second sensing electrode is disposed at a top and a bottom of the third-sub second sensing electrode.

2. The touch panel of claim 1,
   wherein the first and second sensing electrodes are connected with the first and second printed circuit boards through the first and second wire electrodes.

3. The touch panel of claim 1, wherein the first and second printed circuit boards are provided on the unactive area, and the first and second printed circuit boards are provided in opposition to each other on at least one of edge areas of the cover substrate.

4. The touch panel of claim 1, wherein some of the one group of the second sensing electrodes have ends connected with the first printed circuit board, and others of the one group of the second sensing electrodes have opposite ends connected with the first printed circuit board.

5. The touch panel of claim 4, wherein the one group of the second sensing electrodes having the one end connected with the first printed circuit board is alternately aligned with the one group of the second sensing electrodes having the opposite end connected with the first printed circuit board.

6. The touch panel of claim 4, wherein the unactive area comprises first and second unactive areas facing each other, and third and fourth unactive areas facing each other,
   the one group of the second sensing electrodes having the one end connected with the first printed circuit board is connected with the first printed circuit board through a wire electrode extending in a direction of the first unactive area from the fourth unactive area, and
   the one group of the second sensing electrodes having the opposite end connected with the first printed circuit board is connected with the first printed circuit board through a wire electrode extending in the direction of the first unactive area from the third unactive area.

7. The touch panel of claim 1, wherein some of the another group of the second sensing electrodes have ends connected with the second printed circuit board, and others of the another group of the second sensing electrodes have opposite ends connected with the second printed circuit board.

8. The touch panel of claim 7, wherein the another group of the second sensing electrodes having the one end connected with the second printed circuit board is alternately aligned with the another group of the second sensing electrodes having the opposite end connected with the second printed circuit board.

9. The touch panel of claim 7, wherein the unactive area comprises first and second unactive areas facing each other, and third and fourth unactive areas facing each other,
the another group of the second sensing electrodes having the one end connected with the second printed circuit board is connected with the second printed circuit board through a wire electrode extending in a direction of the second unactive area from the fourth unactive area, and
the another group of the second sensing electrodes having the opposite end connected with the second printed circuit board is connected with the second printed circuit board through the wire electrode extending in the direction of the second unactive area from the third unactive area.

10. The touch panel of claim 1, wherein one end of the second sensing electrode is connected with the first printed circuit board, and an opposite end of the second sensing electrode is connected to the second printed circuit board.

11. The touch panel of claim 10, wherein the unactive area comprises first and second unactive areas facing each other, and third and fourth unactive areas facing each other the one end of the second sensing electrode is connected with the first printed circuit board through a wire electrode extending in a direction of the first unactive area from the fourth unactive area, and
the opposite end of the second sensing electrode is connected with the second printed circuit board through a wire electrode extending in a direction of the second unactive area from the third unactive area.

12. The touch panel of claim 1, wherein the unactive area comprises first and second unactive areas facing each other, and third and fourth unactive areas facing each other, and
a number of wire electrodes connected with the first printed circuit board is equal to a number of wire electrodes connected with the second printed circuit board.

13. The touch panel of claim 12, wherein a number of wire electrodes provided in the first unactive area is equal to a number of wire electrodes provided in the second unactive area.

14. The touch panel of claim 12, wherein a number of first sensing electrodes is a half of a number of wire electrodes provided in the first and second unactive areas.

15. The touch panel of claim 12, wherein a number of second sensing electrodes is equal to a number of wire electrodes provided in the first and second unactive areas.

16. The touch panel of claim 1, wherein one end of the second sensing electrode is connected with the first printed circuit board, and an opposite end of the second sensing electrode is connected with the second printed circuit board.

17. The touch panel of claim 1, wherein the printing layer is disposed between the cover substrate and the first printed circuit board or between the cover substrate and the second printed circuit board.

* * * * *